(12) United States Patent
Aggarwal et al.

(10) Patent No.: US 7,385,626 B2
(45) Date of Patent: Jun. 10, 2008

(54) METHOD AND SYSTEM FOR PERFORMING SURVEILLANCE

(75) Inventors: Manoj Aggarwal, Plainsboro, NJ (US); Harpreet Sawhney, West Windsor, NJ (US); Supun Samarasakera, Princeton, NJ (US); Rakesh Kumar, Monmouth Junction, NJ (US); Peter Burt, Princeton, NJ (US); Jayan Eledath, Princeton, NJ (US); Keith J. Hanna, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 710 days.

(21) Appl. No.: 10/638,984

(22) Filed: Aug. 12, 2003

(65) Prior Publication Data
US 2004/0119819 A1 Jun. 24, 2004

Related U.S. Application Data

(60) Provisional application No. 60/419,893, filed on Oct. 21, 2002.

(51) Int. Cl.
*H04N 7/18* (2006.01)
(52) U.S. Cl. .................................................... 348/143
(58) Field of Classification Search ............... 348/143, 348/169, 170, 171, 172, 174, 139, 162, 135, 348/137, 580, 584, 598, 159, 157, 46, 39, 348/57, 47, 50, 164, 167, 168; 382/190, 382/103, 218, 294, 154, 282, 284, 107, 106, 382/255, 295, 296, 219; 340/541, 549, 565; 352/140
See application file for complete search history.

(56) References Cited

U.S. PATENT DOCUMENTS

| | | | | |
|---|---|---|---|---|
| 6,133,946 | A * | 10/2000 | Cavallaro et al. | 348/135 |
| 6,359,647 | B1 * | 3/2002 | Sengupta et al. | 348/154 |
| 6,396,961 | B1 | 5/2002 | Wixson et al. | |
| 7,173,650 | B2 * | 2/2007 | Cohen-Solal et al. | 348/172 |
| 7,208,720 | B2 * | 4/2007 | Hardin et al. | 250/221 |
| 2002/0030741 | A1 * | 3/2002 | Broemmelsiek | 348/169 |
| 2003/0103139 | A1 * | 6/2003 | Pretzer et al. | 348/143 |
| 2003/0213868 | A1 | 11/2003 | Brunner, Jr. et al. | |
| 2004/0046938 | A1 * | 3/2004 | Gero | 352/140 |

OTHER PUBLICATIONS

International Search Report dated Apr. 20, 2004 for corresponding PCT application, PCT/US03/33383.

* cited by examiner

*Primary Examiner*—Tung Vo
*Assistant Examiner*—Behrooz Senfi
(74) *Attorney, Agent, or Firm*—Lowenstein Sandler PC

(57) ABSTRACT

A method and system for detecting moving objects and controlling a surveillance system includes a processing module adapted to receive image information from at least one imaging sensor. The system performs motion detection analysis upon captured images and controls the camera in a specific manner upon detection of a moving object. The image processing uses the camera's physical orientation to a surveillance area to facilitate mapping images captured by the camera to a reference map of the surveillance area. Using the camera orientation, a moving object's position (e.g., latitude, longitude and altitude) within a scene can be derived.

27 Claims, 7 Drawing Sheets

| PTZ COORD. | PIXEL COORD. | |
|---|---|---|
| | X | y |
| (0,1,0) | 110 | 52 |
| (5,2,0) | 235 | 104 |
| ⋮ | ⋮ | ⋮ |
| ⋮ | ⋮ | ⋮ |
| | | |
| | | |
| | | |
| | | |

METHOD AND SYSTEM FOR PERFORMING SURVEILLANCE

CROSS-REFERENCE TO RELATED APPLICATIONS

This application claims benefit of U.S. provisional patent application Ser. No. 60/419,893, filed Oct. 21, 2002, which is herein incorporated by reference.

BACKGROUND OF THE INVENTION

1. Field of the Invention

The present invention generally relates to image processing. More specifically, the invention relates to a surveillance system for detecting static or moving objects from a static or panning camera.

2. Description of the Related Art

In order to provide security of a specific area, adequate surveillance methods and equipment for conducting such surveillance are necessary. Ordinarily, surveillance systems consists of one or more cameras placed on top of a pole or other location of a desired altitude so as to allow the camera a wide field of view that covers the area under surveillance. The cameras may be fixed or may be mounted on a mechanism that allows the cameras to pan (rotate on an axis to expand the angular field of view) and tilt to adjust the angle of the camera's view. The images provided by the cameras are displayed on a plurality of monitors that are viewed or otherwise attended by one or more system operators or guards. Such a system has a number of inherent flaws. Specifically, these systems cannot automatically detect and subsequently track a moving object in the surveillance area. These tasks are the responsibility of the guard or system operator. The guard or system operator may not be able to focus his attention on each monitor simultaneously; therefore, creating a condition where a moving object in one camera's field of view may not be detected because the operator was attending a different monitor. Another problem is that such systems cannot detect or otherwise process moving images when the camera is moving (i.e., either panning or tilting through different fields of view). Such systems also cannot account for momentary image degradation (i.e., if the camera shakes because of wind or ground vibrations) or if a momentary dropout of the signal transmitted from the camera to the system occurs.

Therefore, there is a need in the art for a system that can automatically detect static or moving objects from a static or panning camera. Furthermore, such a system is capable of reducing or eliminating false motion detection that occurs because of minor changes in the monitored environment or momentary system degradation or breakdown.

SUMMARY OF THE INVENTION

The present invention generally provides a method for detecting moving objects and controlling a surveillance system. Such a system includes a processing module that is adapted to receive image information from at least one image capturing device and engineering support data (ESD) regarding the position and status of the image capturing device. The system is adapted to initiate control signals to the image capturing device to perform motion detection analysis upon captured images and to halt such control signals upon detection of an object. In one embodiment, the at least one image capturing device comprises two visible light cameras that are connected to the module by a wireless network or hardwiring. The ESD consists of pan, tilt and zoom values associated with the image capturing device's physical orientation to a surveillance area. The ESD is mapped to corresponding images captured by the image capturing device to create a reference map of the surveillance area. The control signals activate an automatic mode of panning and scanning operations of the image capturing devices and subsequent motion detection analysis in the processing module. These control signals are halted upon the detection of a moving object to allow for a second set of control signals for performing manual control of the image capturing device.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
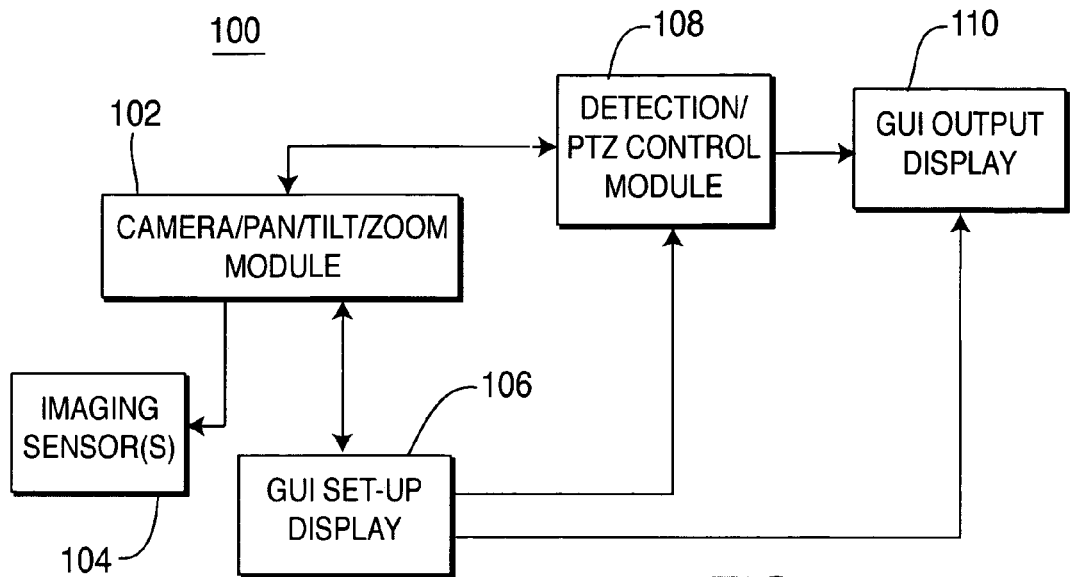
FIG. 1 depicts a block diagram of a system for automatically detecting objects and controlling cameras based on detection status in accordance with the subject invention.

The present invention is a method and system for automatically detecting objects from a static or panning camera or cameras and controlling the operation of such camera(s) based upon object detection status. FIG. 1 depicts a block diagram of an object motion detection system 100 in accordance with the subject invention. The system 100 comprises a plurality of modules and interfaces that are interconnected in a manner so as to facilitate establishing a reference field of view for surveillance, obtaining and processing images from said surveillance area, automatically detecting moving objects in the surveillance area, displaying information regarding the status of the area under surveillance and selectively changing the mode of operation of the camera(s) connected to the system 100. In greater detail and by way of non-limiting example, the system 100 comprises a camera pan/tilt/zoom (PTZ) module 102 that controls the pan/tilt/zoom parameters of at least one imaging sensor 103 (e.g., a visible or infrared camera), a graphical user interface (GUI) set-up display 106, a detection/PTZ control module 108 and a GUI output display 110. The function of each of these interconnected modules and interfaces (described in greater detail below) provides the system with the ability to process images from the camera PTZ module 102 while the camera is still, panning or zooming and compare the images to a reference so as to detect moving objects.

Figure 10:
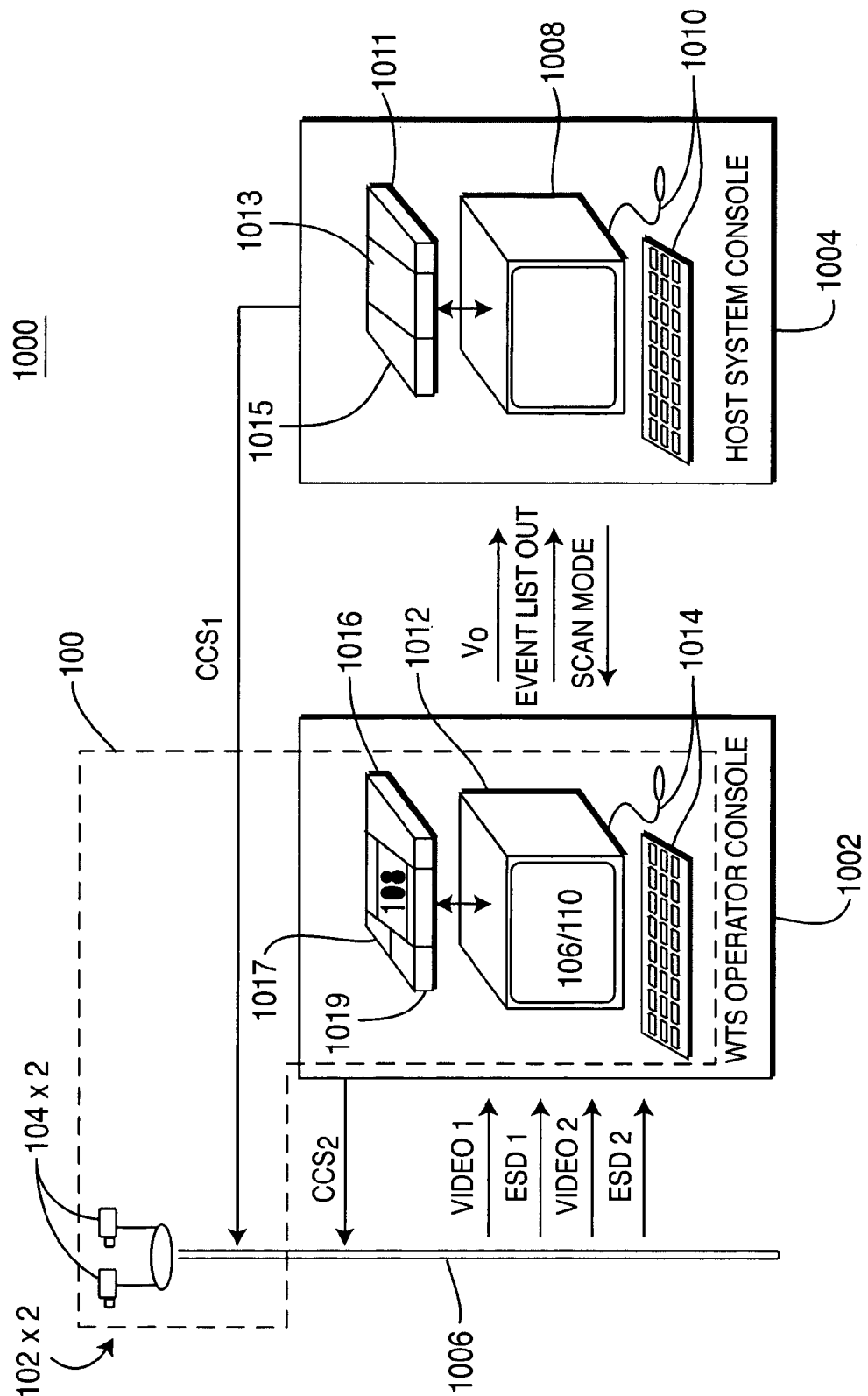
FIG. 10 is a schematic representation of one embodiment of the subject invention cooperating with an existing surveillance system.

The camera/PTZ module 102 is coupled to one or more imaging sensors such as, for example, cameras 104 (as shown in FIG. 1 and 10) that are capable of capturing and transmitting video signals to the system 100 generally (but not exclusively) in an NTSC signal format. For example, the camera 104 can be a visible light camera transmitting video signals at a rate of approximately 30 Hz in either a 720×488 progressive scan or 720×244 interlaced format. In one embodiment of the subject invention, the video signals are in S-video format from a progressive scan camera and free of compression artifacts and transmission noise. In an alternative embodiment, the camera(s) 104 can capture infrared (IR) information in an interlaced NTSC format, which is effective for nighttime surveillance of the area. Such cameras can be hardwired into the system 100 or transmit signals via a wireless network via a series of antennas (not shown) attached to each module. Direct connection of the camera(s) 104 to the system 100 can be, for example, by cable (e.g., RS 232) or by a fiber optic connection. Such functions as focus, brightness, and contrast can all be adjusted on the camera 104 via the system 100 and particularly via the GUI set-up display 106 or the detection/PTZ control module 108 based on commands from an operator. The video signals are processed by the system 100 to generate a set of image (or pixel) coordinates in two dimensions (X,Y). A zoom lens is typically connected to each of the camera(s) 104 so as to facilitate selective detailed viewing of a particular object of the area. Other camera functions such as aperture, signal gain and other such settings are likewise controlled by the detection/PTZ control module 108.

The camera/PTZ module 102 is physically mounted to a support structure such as a building or pole. The camera/PTZ module 102 is controlled by sending pan, tilt and zoom commands from the detection/PTZ control module 108. The commands (or signals) also known as Engineering Support Data (ESD) are passed between the camera/PTZ module 102 and the detection/PTZ control module 108 via cables or wireless link. In one illustrative embodiment of the invention, the ESD relayed from camera/PTZ module 102 is accurate to better than 1° pointing precision and updated at 10 Hz or better. In one degree of movement provided by the subject invention, the detection/PTZ control module 108 sends commands such that the camera(s) 104 sweep across the surveillance area. As the camera(s) 104 point further into the distance of such area, the detection/PTZ control module 108 can optionally send commands to zoom in on a particular object. Such commands may be manual on the part of a system operator or a guard, or automatically produced in response to an object being detected in the field of view of the camera. The camera/PTZ module 102 provides a series of coordinates that the system 100 recognizes as particular camera position for a given video signal. Thus, it is possible to map the camera position in the real world (pan, tilt, zoom parameters that are herein defines as PTZ coordinates) to the captured images (image or pixel coordinates).

Given the mechanical nature of some components of the camera/PTZ module 102, signals are passed between this module and the detection/PTZ control module 108 in the range of approximately 10 Hz. As discussed above, video signals are coupled between the camera/PTZ module 102 and the rest of the system 100 at a rate of approximately 30 Hz. Since there is an appreciable difference between the transmission rates of the video signals and the PTZ control signals used in the system, such differences in the video and PTZ control signals should be accounted for so as to prevent misalignment of image or pixel coordinates and PTZ coordinates. Since the panning operation of the camera 104 is linear, it is acceptable to use a linear interpolation method to make assumptions or predictions of PTZ coordinates in between the transmission of actual PTZ coordinate information.

In an alternative embodiment and with respect to accounting for differences in image or pixel coordinates and PTZ coordinates, a closed loop system is established. Specifically, the X,Y pixel coordinates of a specific object on the screen is determined and powers a negative feedback loop. The feedback loop also contains the last received PTZ coordinates of the camera 104 when positioned on the specific object so as to generate a corrected PTZ coordinate for the object. For example, a given PTZ value is established by signals from the camera/PTZ module 102 and interpreted by the detection/PTZ control module 108. Additionally, an object in the field of view of the camera 104 is detected and its X,Y pixel coordinates are established by the system 100. The X,Y pixel coordinates may be, for example, 100 pixels to the right of the PTZ coordinates which creates a slight error in the exact location of the object with respect to the PTZ coordinates currently in the system 100. By passing the X,Y image coordinates through the negative feedback loop, the PTZ coordinates are adjusted so as to center the object on the screen and provide a more accurate reading of the specific camera position; hence, real world position of the object. Alternately, adjustments between the PTZ coordinates and the image coordinates may be performed in a three-dimensional domain. That is, the system 100 can analyze the latitude and longitude coordinates of a detected object and place these coordinates into the feedback loop instead of the X,Y pixel coordinates. One advantage of using the 3-D domain and method is that the height of the object can also be determined and assumptions can be made about the identity of the object based upon its size and relative speed. Consequently, an object's latitude, longitude and altitude can be determined.

The GUI set-up display 106 establishes a reference image (hereinafter referred to as a Zone Map) to establish a baseline of the area under surveillance. Specifically, the GUI set-up display 106 captures a series of images which may be segmented into a series of customized regions which are assigned various detection thresholds for detecting moving objects. Two-dimensional (X,Y) coordinates defining said regions form part of a look-up table of values that are mapped to PTZ coordinates. As such, when the camera/PTZ module 102 is in panning and scanning mode, the PTZ coordinates are coupled to the look-up table and a determination is made as to which detection threshold should be used to process panned and scanned images based on the Zone Map created by the system. The details of the GUI set-up display 106 are described with respect to system initialization methods shown in FIGS. 2 and 3 and the corresponding pictograms of FIGS. 8 and 9 respectively. The reader is directed to these figures along with the following description.

Figure 2:
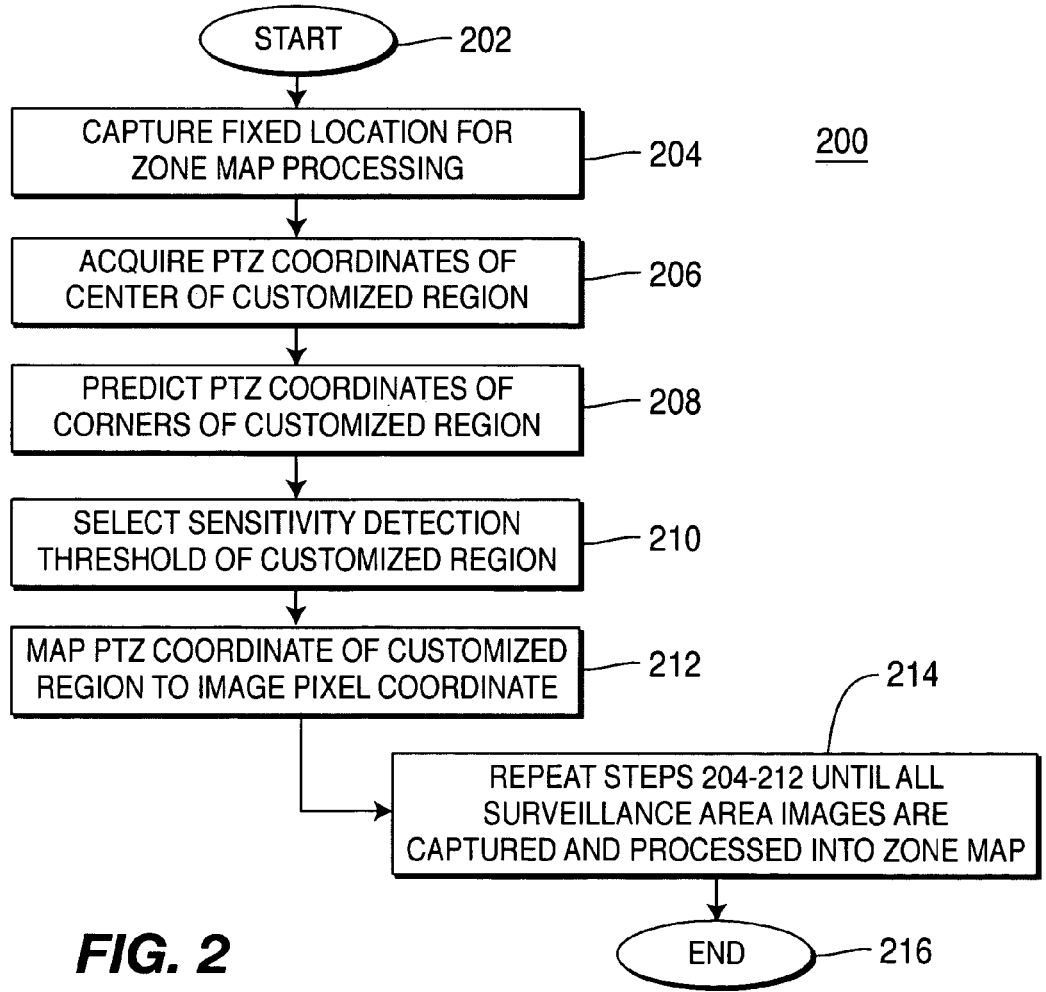
FIG. 2 depicts a flow chart of a method for manually initializing the object detection system of FIG. 1.
Figure 8:
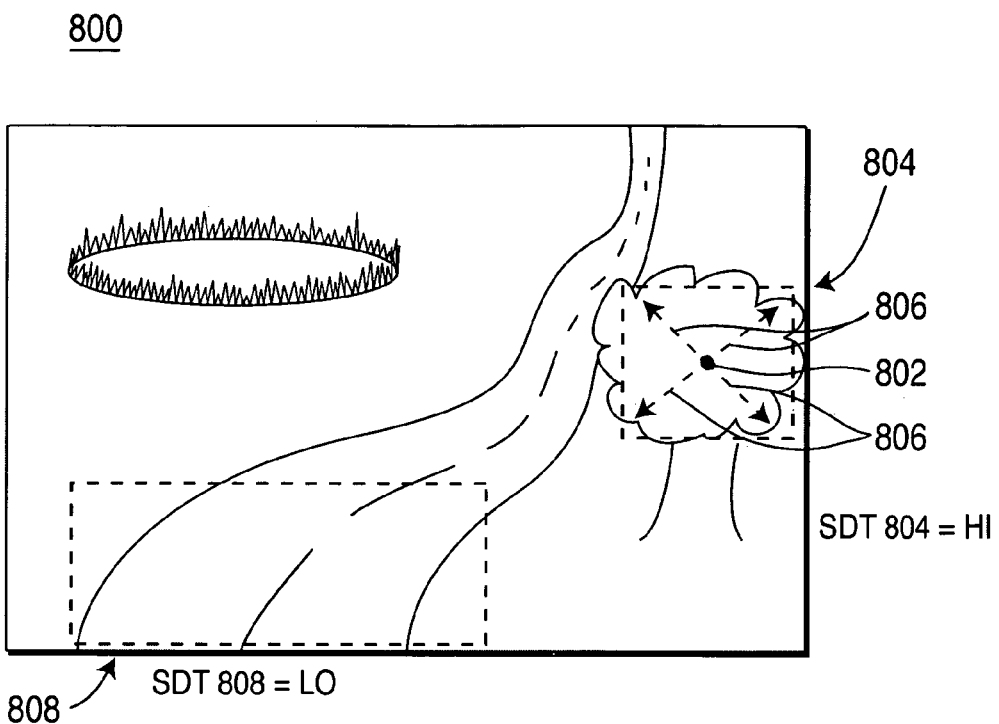
FIG. 8 is a pictogram of a single frame of video processed by the method of FIG. 2.

FIG. 2 depicts a series of method steps 200 which are used to manually establish a Zone Map for the object detection system 100. Specifically, the method starts at step 202 and proceeds to step 204 where an image capture operation is performed to capture a fixed location that is part of the complete area which is to be included in the surveillance. Such fixed location is captured or otherwise fully displayed on a monitor or operator view screen via the appropriate PTZ control signals entered by a system operator. FIG. 8 depicts a representation of such a displayed video image 800. At step 206, a system operator selects a customized region 804 that is of interest for surveillance. The PTZ coordinate 802 of the center of the customized region 804 is acquired (processed by the system 100). At step 208, the PTZ coordinates of the corners of the customized region 804 are predicted (as seen by the dashed diagonal lines 806) from the center PTZ coordinate 802. For example, since the PTZ coordinate of the center is known (as this is where the camera is looking) and the camera geometry is known, predictions can be made as to the coordinates of, for example, a rectangular, customized region based upon known imaging algorithms.

At step 210, the operator instructs the system 100 to assign a certain sensitivity detection threshold level to the customized region 804. For example, should the customized region 804 contain an image of a moving, yet benign, object (a body of water or a tree with leaves rustling in the wind, or the like), the operator can instruct system 100 to set the sensitivity detection threshold very high for such region or not at all. In this way, the likelihood of a false alarm triggered by movement in such customized regions is greatly reduced. Of course, in the circumstance where the operator instructs the system 100 to not process any motion in the customized region, there is no likelihood of an alarm being sent. Alternately, should a second customized region 808 contain an image where nonbenign objects may be detected (a road where cars or people may travel along) the sensitivity detection threshold is set low. If the operator does not select a sensitivity detection threshold, the system 100 automatically selects a default threshold.

At step 212, the PTZ coordinate of the customized region 804 is mapped to the specific X,Y pixel coordinates of the image. As such, for every PTZ coordinate value of a given camera position, there is a corresponding X,Y pixel coordinate in a corresponding image. Thus, a reference library (i.e., the Zone Map) is built in the form of a look-up table 400 such as one shown in FIG. 4. Specifically, a first column 402 of the look-up table contains the PTZ coordinates as determined by the data provided by the camera/PTZ module 102 which is passed on to the detection/PTZ control module 108. A second column 404 of the look-up table contains the X,Y image or pixel coordinates of the image that corresponds to the PTZ coordinates (camera position). In a further embodiment, the PTZ coordinates are mapped to a latitude, longitude and altitude. This mapping is performed using a full 3D model of the scene imaged by the camera (i.e., the model comprises a terrain elevation map as well as a model of the scene contents such as buildings). Using such information, the system may predict the sight line between the camera and an object in the scene as well as the distance to the object. As such, the optimal camera view of an object can be automatically selected, e.g., a particular camera in a plurality of cameras can be selected, a particular set of pan/tilt/zoom parameters can be used to optimally image the object, or both.

The method 200 proceeds to step 214 where the next image representing a fixed location is captured, processed and mapped according to steps 204 through 212 as described above. When all of the images constituting the area under surveillance are so processed, the Zone Map is complete and the method ends at step 216.

Figures 3, 4:
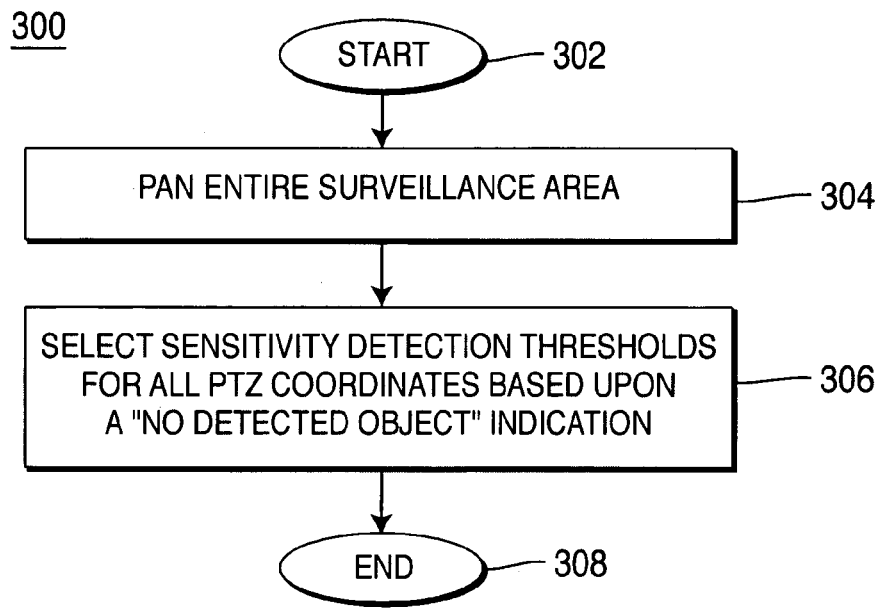
FIG. 3 is a flow chart of a method for automatically initializing the object detection system of FIG. 1.
FIG. 4 is a look-up table of camera coordinates that correlate to X,Y pixel coordinates of images captured by the camera.
Figure 9:
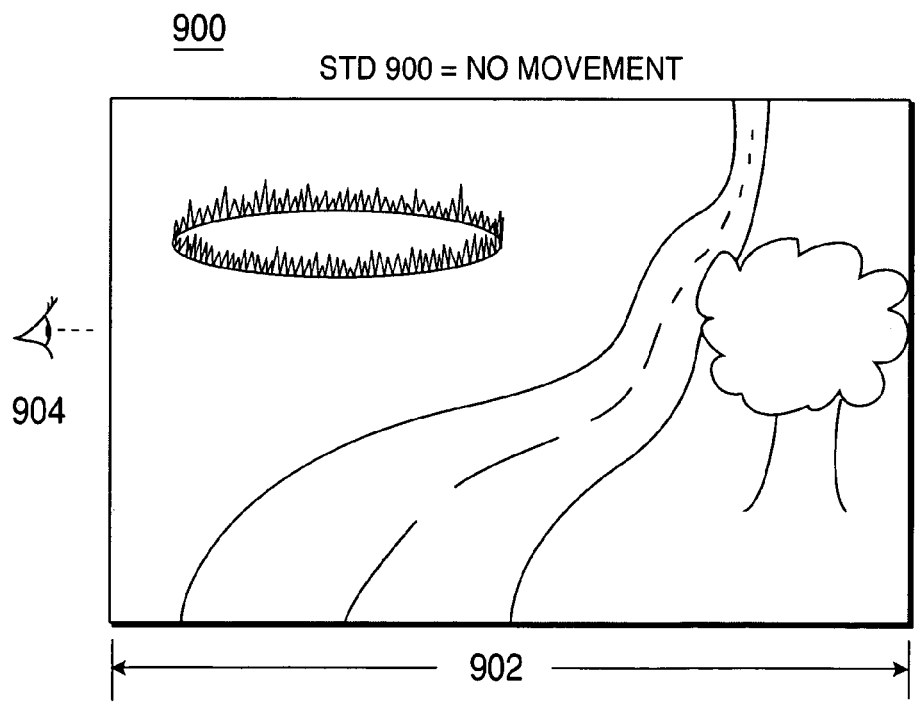
FIG. 9 is a pictogram of a single frame of video processed by the method of FIG. 3.

An alternate method for setting up the Zone Map and table shown in FIG. 3 is by automatically allowing the system 100 to process the surveillance region under the direction of the operator. For example, FIG. 3 depicts a series of method steps 300 for auto-setup of the Zone Map. FIG. 9 depicts a representation of such a displayed video image 900. The method starts at step 302 and proceeds to step 304 where the system 100 is instructed to pan the entire surveillance area (denoted by panning arrows 902). As the system pans the entire surveillance area, an operator or guard 904 passively ensures that there are no nonbenign moving objects existing in the scenery being panned. That is, the system 100 captures what is essentially an entire benign surveillance region regardless of any absolute motion (tree leaves rustling in the wind or shimmering detected by surface water or small animal movement or the like) to establish the reference image. At step 306, the system 100 automatically sets the sensitivity detection threshold at each PTZ coordinate that was scanned based on the fact that the operator has indicated that there was no (relative) motion in any of the captured reference images. The method ends at step 308. This alternate auto-setup mode has the advantage of removing the tedious steps of having to manually mark up and create customized regions on the part of a user. Since PTZ coordinates recall is repeatable and accurate with respect to the system 100, the ability to create a PTZ to pixel value correlation (i.e., the table of FIG. 4 or other similar table) can be generated by mathematical calculations.

It should be noted that either initialization process works very well for a stationary camera application (mounted at the top of a pole or high altitude structure). However, in a more sophisticated, multi-camera system, the concept of camera handoff should be considered. Camera handoff involves using two or more cameras to increase the surveillance area. In such an environment, the system 100 needs to account for the overlapping images sent to the system 100 without setting a false detection alarm. Geolocation or georegistration of the source images is performed. In other words, an image $I_1$, from one source (first camera $C_1$) is geo-located to an orthographic representation (i.e., surface map) of the surveillance area (by ascertaining the latitude and longitude coordinates) before the image data transmission responsibilities are handed off to a second source (second camera $C_2$). The system 100 can then use the known coordinates of $I_1$ and instruct camera 2 to point to those coordinates (i.e., via signals sent by the detection/PTZ control module 108) prior to transmitting image data $I_2$. In this way, a seamless transition (from camera 1 to camera 2) is performed and the surveillance area remains completely monitored during the hand-off period as $I_1$ and $I_2$ are essentially the same image viewed from two different locations. If any uncertainty exists in the position estimate, the second camera can scan in the direction of the uncertainty, until the object is automatically detected.

If the system 100 is using a moving camera (e.g., in an unmanned aero vehicle (UAV)), a more sophisticated coordinate system is necessary. Additionally, it should also be noted that the accuracy in the system is substantial enough to use solely the center PTZ coordinate for any given customized region. That is, the corner coordinates of a customized region can essentially be collapsed by mathematical algorithm into a center point which is represented by the center PTZ coordinate.

Figure 5:
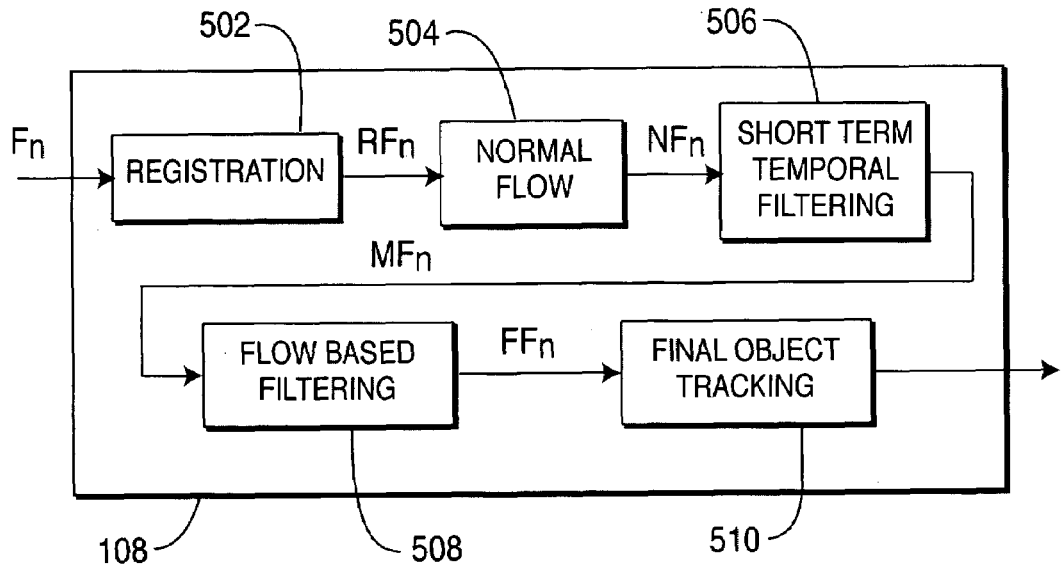
FIG. 5 is a detailed schematic diagram of the detection/PTZ control module of the subject invention.

The detection/PTZ control module 108 can detect static or moving objects when the camera is static (a manual control mode), panning (an automated continuous scan mode) or a mix of both operations (a step/stare mode). When the camera is panning, the module performs image alignment between video frames to remove image motion caused by the camera pan. Methods for performing alignment have been performed previously, such as those described in "Hierarchical Model-based motion analysis" (Proceedings of European Conference on Computer Vision 1992, Bergen et al.). Residual motion after alignment indicates a moving object. However, and as discussed earlier, motion may occur for example by trees waving in the breeze. A number of sub-modules have been put in place to address this problem. Specifically, FIG. 5 depicts a detailed schematic diagram of the detection/PTZ control module 108 that further comprises a Registration sub-module 502, a Normal flow sub-module 504, a Short-Term Temporal Filtering sub-module 506, a Flow Based Filtering sub-module 508 and a Final Object Tracking sub-module 510. Each of the sub-modules provides a different image processing algorithm to access the probability that detected objects are actually of interest to the operator or guard.

Initial registration of the incoming video frames Fn into the detection/PTZ control module 108 essential allows the system to "see" one background through a given number of frames. By eliminating the motion of the background (caused by a panning camera) any truly moving objects can be identified. Such registration is performed by the Registration Sub-module 502 in accordance with a registration technique such as that seen and described in the above-identified reference to Bergen et al. For example, images are acquired from a panning or stationary camera over a period of 1-2 seconds. The pixel texture in the imagery is measured and if it is sufficient, then the images are aligned to each other. If the measured pixel texture is insufficient for alignment, then the camera/PTZ module 102 is directed to stop so that new images can be acquired without image motion due to camera pan. The result is a series of registered frames $RF_n$ that are passed on for further object detection processing. For example, and based upon predetermined system parameters, a plurality of frames beginning with the zeroth frame to an nth frame are registered to each other. Such registration step eliminates portions of images between said frames that are not common to all frames. That is to say as the camera pans a certain area and passes images onto the system, fringe areas of the early frames and the later frames will not be common to all frames. The registration step removes such fringe areas.

A problem may occur during initial registration if an object in the frame is too large as the system may attempt to register future frames based on this object instead of the background (i.e., a large truck moving through a zoomed in camera location). To account for such a condition, the contrast of the initially captured image is increased so as to more highly identify the object. The system is subsequently instructed to register the incoming frames based upon low contrast areas (the background) and not high contrast area (moving object). An alternate solution to registration improvement is to capture an initial image (with a large object) and mask the object to force registration based upon the background.

After image registration is completed, actual detection of moving objects within the image is performed via a plurality of filters. In initial object detection, the imagery from the background alignment step is processed to detect brightness changes between frames. The aligned imagery may contain brightness changes due to an intruder walking in the scene, for example. In saliency computation, any detected pixel brightness changes are evaluated in three steps. First, the pan, tilt and zoom values are read and used to recall the expected size, shape and detection sensitivity for any pixel change in the region, given the customized region, size and classification parameters defined by the setup operator in the initialization step. Second, the actual size and shape of the brightness changes are measured and changes that do not match the expected criteria are rejected. These brightness changes may correspond to expected vehicle activity on a road, for example. Third, image correspondence algorithms are performed over the aligned image sequence, and the positions of the brightness changes are measured for every frame. If the measured displacement of each brightness change does not exceed a pre-determined value, then the brightness change is rejected. The brightness change may be due to a tree blowing in the wind, for example. In all other cases, an alarm condition is declared.

In the case where image texture is insufficient for alignment, the camera/PTZ module 102 is directed to stop scanning and the displacement of the brightness changes are measured in the newly captured imagery. If the measured displacement exceeds a second pre-set value over a period of time, then an alarm condition is declared. In this case, an alarm condition is not declared as quickly, since over short periods of time the pixel displacement of the brightness changes may be due to camera vibration and not intruder motion.

The Normal Flow sub-module 504 is a relatively low-level filter that detects a variety of different types of motions in a given image. For example, the Normal Flow Filter distinguishes between stable background and motion selected from the group consisting of trees and leaves, scintillation from surface water movement, shimmering of the background from heat, momentary camera defocusing or image blur and an object displaying characteristics of salient (consistent) motion between two points.

Figure 6:
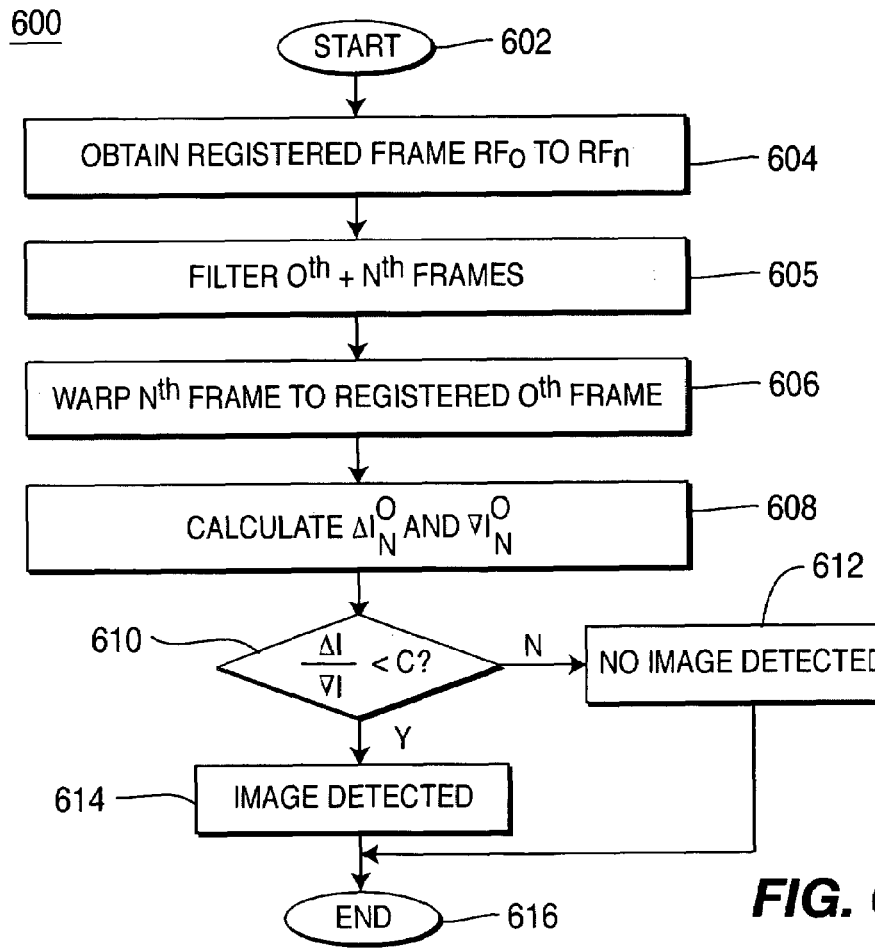
FIG. 6 is a flow chart depicting an image processing method for object detection in accordance with the subject invention.

Normal Flow filtering is performed in accordance with the series of method steps 600 depicted in FIG. 6. Specifically, the series of method steps 600 starts at step 602 and proceeds to step 604 where a series of registered input image frames $RF_n$ (for example, images $F_n$ captured by a camera/PTZ module 102 and coupled to a detection/PTZ control module 108) are obtained from the registration sub-module 502. Step 605 performs a filtering of the zeroth and nth frames to account for any differences between the images which may not be directly caused by specific motion. For example, if the automatic gain control (AGC) were to momentarily vary, there would be differences between the zeroth and nth frames yet there is no specific motion. Accordingly, the filtering step 605 accounts for such differences. At step 606, a warping step is performed to register the nth frame to the aligned or registered zeroth frame. It should be noted that steps 605 and 606 may be interchanged. That is, the warping of the nth to the zeroth frame and the filtering of said frames is interchangeable without any effect on the resultant ability to detect motion in said frames. Normal flow sub-module 504 outputs a series of normal flow parameters ($NF_0$, $NF_1 \ldots NF_n$) based on the normal flow processing method 600.

A comparison of the last frame analyzed in the series of frames is compared to the zeroth frame. Any differences between such two frames is considered of potential relevance for detection. Accordingly, a criteria must be established to determine the level of motion detected between the zeroth frame and the nth frame. Such determinations are made by calculating the change in the image between the zeroth and nth frame ($\Delta I_N^0$) and a gradient of these same frames ($\nabla I_N^0$) in step 608. The $\Delta I$ accounts for relative motion changes in the images while the $\nabla I$ is a normalization to account for changes in contrast which are not necessarily motion changes (which is in furtherance to the filtering of step 605). At step 610, a mathematical operation is performed by comparing the ratio of $\Delta I$ to $\nabla I$ and determining whether it is greater than a constant C, which is a low-level motion detection threshold. If $$\frac{\Delta I}{\nabla I}$$

is less than the detection threshold C, the method moves to step 612 where no moving object is detected and proceeds to step 616 to complete normal flow filtering. If $$\frac{\Delta I}{\nabla I}$$

is greater than the low level motion detection constant C, the method moves to step 614 where a possible moving object detected status is indicated.

Figure 7:
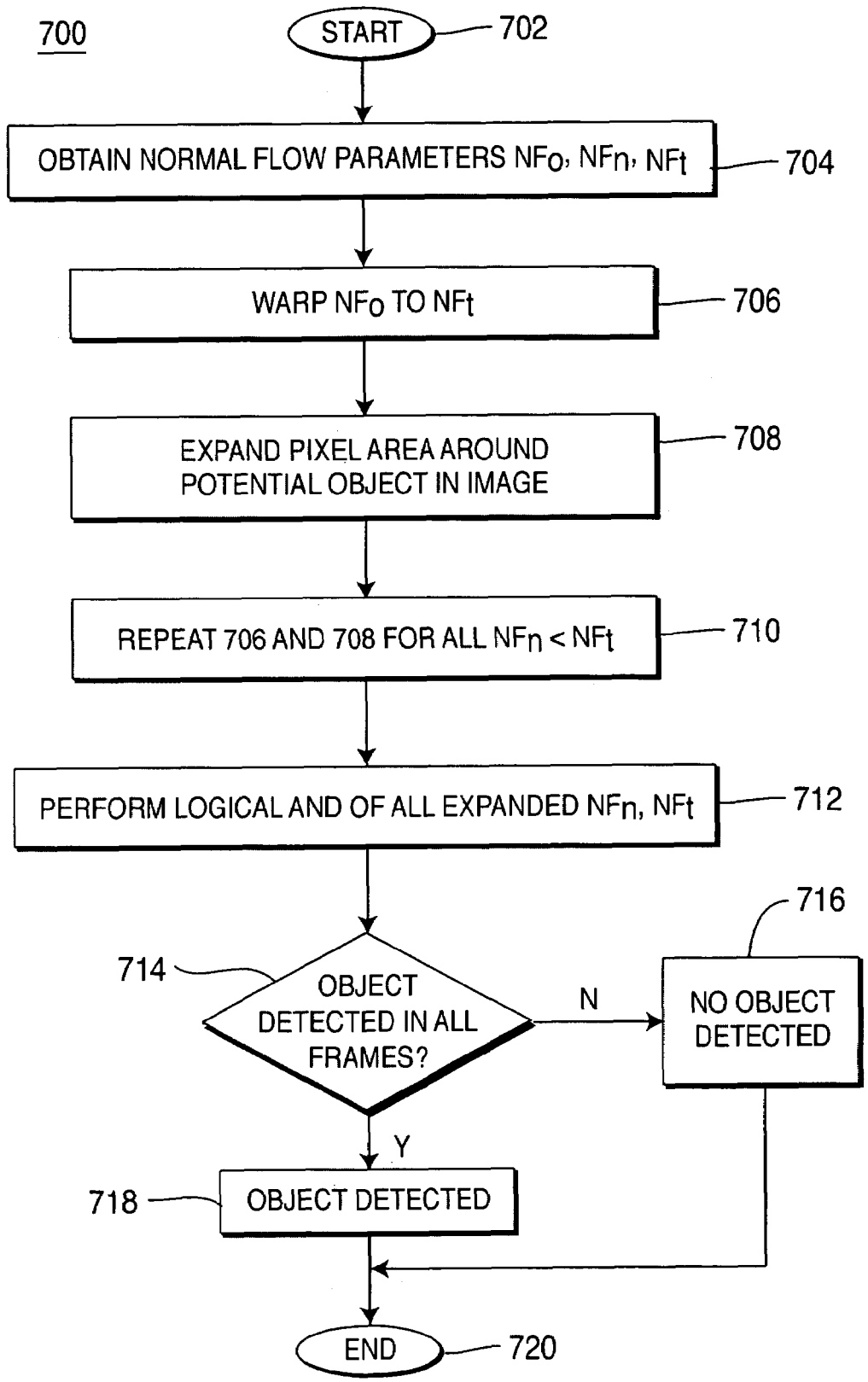
FIG. 7 is a flow chart depicting a second image processing method for object detection in accordance with the subject invention.

The Short Term Temporal Filtering (STTF) sub-module 506 reduces false detects caused by random noise and blurs in an image. As such, this module represents a next order higher level of filtering by detecting consistent motion over a number of frames. In other words, if an object is "detected" by normal flow filtering, STTF will determine if the object was momentary (i.e., seen in one or two frames) or consistent over a long span of time. The function of this module in described here and in accordance with a series of method steps 700 depicted in FIG. 7.

The series of method steps 700 begins at step 702 and proceeds to step 704 where normal flow parameters ($NF_0$, $NF_1$ . . . ) from the normal flow submodule 504 are obtained for further processing. Once these parameters are obtained, the method 700 proceeds to step 706 where the initial normal flow parameter from the zeroth frame ($NF_0$) is warped onto a predetermined final frame $NF_t$. Such warping is performed in accordance with well-known image process algorithms. At step 708, the pixel area around a potential object in image frame $NF_0$ is expanded. This expansion of the pixel area allows for analysis of a slightly larger area than that of the potentially detected object as so as to determine if there is movement on a frame to frame basis. At step 710, steps 706 and step 708 are repeated for all normal flow parameters that are less than the normal flow parameter at time t so as to create a series of parameters that have image frames that are aligned to one another as well as contain expanded pixel areas around the potential object. At step 712, a logical AND of all expanded normal flow parameters $NF_n$ and the normal flow parameter at time $NF_t$ is performed to determine if motion has occurred across the entire expanded pixel area. At step 714, a decision operation is performed to determine if an object has been detected in all frames (by virtue of a logical one resulting from the AND operation of all normal flow parameters). If an object has been detected the method proceeds to step 718 which sets an object detected condition. If the logical AND operation results in a logical zero, it is determined in decision step 714 that no object has been detected and the method moves to step 716 to set such condition. The method ends at step 720. Such method of processing the image frames and pixel information is considered highly efficient because it is not necessary to process an entire image frame. That is, at parameter value $NF_t$ only pixels which are highlighted as potentially being objects are of interest, and preceding image frames and the attendant normal flow parameters are processed to focus on such pixels of interest determined by $NF_t$. As such, $NF_t$ determines the pixels of interest and the expanded pixel area and the invention essentially backtracks through previous frames and parameters to highlight, expand and then logical AND the same points of interest detected in $NF_t$.

The output of the STTF sub-module 506 is a series of motion flow parameters (represented as $MF_1$, $MF_2$ . . . $MF_n$) which are essentially a "cleaner" representation of pixels that may constitute actual motion in a particular image. In an effort to further "clean" or resolve which pixels are actually moving in a particular motion of interest, a longer term filter is used and is represented by Flow Based sub-module 508. Specifically, Flow Based sub-module 508 contains the necessary components and algorithms to perform a connected component analysis of the motion flow parameters from the STTF sub-module 506. The connected component analysis results in the creation of optical flow parameters which essentially isolate pixels that have motion and are to be studied further for a particular type of motion or saliency. Flow-based motion tracking is then used to check that objects have moved a certain distance before being identified as a moving object. A flow algorithm has been described previously in "Hierarchical Model-based motion analysis" (Proceedings of European Conference on Computer Vision 1992, Bergen et. al.). The flow is computed between frames, and then concatenated such that pixels can be tracked across the image. Essentially, the images are again realigned (to remove the background as a noise source) and the incremental motion of a particular pixel set is determined over a number of pre-determined frames. If the object has moved by more than a pre-determined number of pixels, then a detection is declared. However, the motion of the object must also pass a second test to determine if the motion is erratic or consistent. If the motion is erratic (e.g., leaf on a tree, foraging small animal), then no object of interest is detected. If the motion is consistent (e.g., human walking in a path, automobile traveling along a road), then a true object of interest is detected.

The final sub-module of the PTZ/Detection module 108 is a Final Object Tracking sub-module 510. This sub-module performs a type of secondary short term filtering (similar in concept to the STTF sub-module 506). That is, Final Flow parameters ($FF_1$, $FF_2$, . . . $FF_n$) are generated by the Flow Based sub-module 508 and passed on to the Final Object Tracking sub-module 510. Such parameters are processed via a much simpler algorithm than those processed by the STTF sub-module 506, but still result in parameters indicative of movement. For example, the centroids of two consecutive FF parameters ($FF_2$ and $FF_3$) are calculated. The centroid of $FF_t$ is warped back onto $FFt_{t-1}$ (in this particular example, the centroid of $FF_3$ is warped back to the centroid of $FF_2$) and a determination is made as to whether the same object of interest seen in $FF_2$ is still seen in $FF_3$. This gives an indication of consistent motion of the SAME object through a pre-determined number of frames. Accordingly, object tracking is not only confirmed, but is also historically shown as the same object that was previously detected. Although a tracking algorithm through two frames has been discussed, any number of frames can be processed or analyzed in the Final Object Tracking sub-module 510 and such predeterminations can be made by a system operator based on the known speed of objects desired to be tracked and identified.

After image analysis and filtering is completed by the detection/PTZ control module 108, the appropriate detection signals are forwarded to the GUI output display module 110. For example, motion detection signals such as those generated by decision block 610 and/or 714 of methods 600 and/or 700 respectively that have been subsequently confirmed as salient (consistently tracked) objects generate information that is provided to the GUI output display module 110 whereby a number of options are available to the user (i.e., guard). First, an audible alarm may be sounded or other type of alert activated which changes the status of camera control from automatic to manual and is described in greater detail below. The guard can then decide steps to be taken. Second, video of the moving object is stored and displayed. Video is stored and displayed before, during and after the detection of the object. The video (NTSC or digital format) may be stored directly onto a computer as an AVI file, for example, or may be stored on a VDR (Video disk recorder) machine either as part of the GUI output display module 110 or at a remote location. A guard can then browse the video, checking the moving object even while the system is continuing to pan across the scene. Third, object data is displayed such as location in the Zone Map, approximate size, velocity of the object and its apparent classification. This object data facilitates confirmation of the object seen in the video.

In an alternate detection scenario, the system stops the pan/tilt/zoom scan and directs the camera to point to the location derived from the image coordinates of the detection. This is performed using the look-up table (FIG. 4) that was determined in the initialization mode, and also by storing the pan/tilt/zoom values with the record of the moving object. These values can also be fed back into the GUI output display so that a user can click on an icon on the display, and the camera automatically points to the correct location.

As an added feature of the system 100, the GUI output display module 110 also shows the detected object geo-located on an output map display. This is performed using the look-up table that was defined in the initialization mode that related real-world features in the scene to the pan/tilt/zoom values and the image location.

The knowledge of both types of data can be used in a single GUI output display to further enhance image identification. This is performed by feeding the coordinate information (i.e., the location of the object based upon GPS coordinates and pan/tilt/zoom values and corresponding X,Y values) to the GUI display. For example, a basic pixel analysis (X,Y coordinate information only) will make it difficult to identify a car in the distance from a person at a mid-range location from a small object at close range as they will all have a closely matched pixel count. However, if GPS information is processed concurrently, then the relative speed of the object can be determined or at least the distance of the object from the camera. As such, it is much easier to identify the object based on the known characteristics of objects that are normally detected.

The GUI set-up module 106 may also be used to calibrate the GUI output display module 110. The GUI output display module 110 may show an orthographic or other view of the scene. Since the camera is often looking at a shallow angle miles out into the distance, a small change in angle or small change in ground elevation results in the camera looking at a very different location on the ground. The GUI output display is calibrated by having the orthographic or other (e.g., map view) shown on the display. A user then points the camera manually towards a feature in the scene that is recognizable in both the camera image and on the map display, for example, a building or a road junction. The user then clicks on the map and also the image and the correspondence between the two points is stored. The user then repeats this process for many points across the scene. Next a planar 3D model of the world is fit to the points such that the plane passes through the bottom of the pole on which the camera is mounted. Simple geometry relates the pan/tilt/zoom position of the camera to the position of a point on the plane. In one version of the system, this is the method for predicting the pan/tilt/zoom values required to point the camera at a particular map location. In a second version of the system, the 3D points are interpolated to produce a smooth 3D surface between points. In a third version of the system, DEM or map elevation data from a geographical survey is read into the system to work instead of or in addition to the methods described in the first and second methods. These methods can also be used to interpolate the regions of interest (e.g., polygons) that were highlighted to modify detection sensitivity across the scene.

One specific application and operation of the object detection system 100 is seen in FIG. 10 and is described as follows. The object detection system 100 is integrated into an existing surveillance system to form a variable control object detection and surveillance (VCODS) system 1000. The VCODS system 1000 includes a motion detection analysis module 1002, a surveillance module 1004 and a plurality of camera/PTZ modules 102 mounted to a supporting structure 1006 (i.e., pole, ceiling beams or the like). The surveillance module 1004 is a general purpose computer with various input/output devices 1010, 1008 with a central processing unit 1011, a memory 1013 and supporting circuitry 1015 for maintaining and monitoring components of an existing surveillance system. The surveillance module 1004 also generates a first set of camera control signals CCS1 to control the plurality of camera/PTZ modules 102 during manual control of the VCODS 1000. Such functions being performed by virtue of the CPU 1011, memory 1013, support circuits 1015 and attendant I/O devices 1008 and 1010.

The motion detection analysis module 1002 is also a general purpose computer with various input/output devices 1012, 1014 with a central processing unit 1016, a memory 1017 and supporting circuitry 1019 for carrying out tasks for motion detection. For example, the motion detection analysis module 1002 is adapted to accept video images and ESD from each of the plurality of camera/PTZ modules 102. Specifically, video signals Video 1 and Video 2 are inputted from the camera/PTZ modules 102 to the motion detection analysis module 1002 for prediction of a moving object in the images captured by the cameras. Simultaneously, ESD (pan, tilt and zoom coordinates) are inputted to the motion detection analysis module 1002 for correlation of the video images from the cameras to a reference map of the area under surveillance. Similar to the surveillance module 1004, the motion detection analysis module 1002 also generates camera control signals (i.e., a second set of camera control signals CCS2) to control the plurality of camera/PTZ modules 102. However, camera control signals CCS2 are provided to the camera/PTZ modules 102 during automatic control of the VCODS 1000. All of such processing is performed by virtue of the CPU 1016, memory 1017, support circuits 1019 and attendant I/O devices 1012 and 1014. The Detection/PTZ Control module 108 can be a physical device which is coupled to the CPU 1016 through a communication channel. Alternatively, the Detection/PTZ Control module 108 can be represented by a software application which is loaded from a storage device and resides in the memory 1017. As such, the Detection/PTZ Control module 108 of the present invention can be stored on a computer readable medium.

Either computer (motion detection analysis module 1002 or surveillance module 1004) can be coupled to its plurality of respective input and output devices, such as a keyboard, a mouse, a camera, a camcorder, a video monitor, any number of imaging devices or storage devices, including but not limited to, a tape drive, a floppy drive, a hard disk drive or a compact disk drive.

Figure 11:
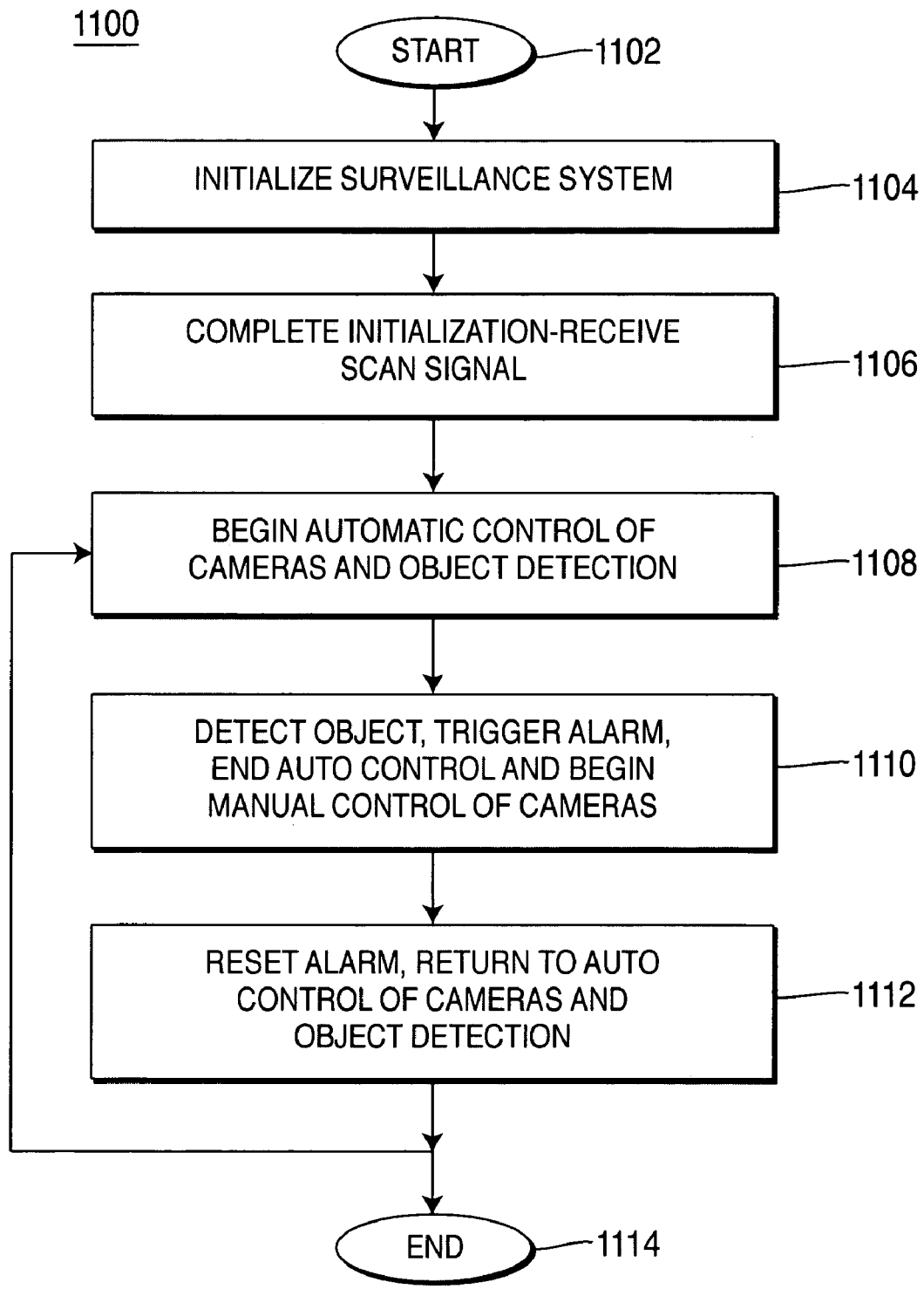
FIG. 11 is flow chart of a method for controlling cameras of a surveillance system in accordance with the subject invention.

System operation (and more specifically, the tasking of the Detection/PTZ Control module 108 and motion detection analysis module 1002 in general) is seen in FIG. 11 as a series of method steps 1100 and described herein in detail. The method starts at step 1102 and proceeds to step 1104 wherein system initialization is performed. Such initialization is performed for example by manual selection of the sensitivity thresholds performed in accordance with method 200 or by automatic initialization performed in accordance with method 300. In one example of manual initialization in accordance with method 200, a system operator accesses the surveillance module 1004 to generate camera control signals CCS1 to point the camera(s) to a fixed location. The system operator then accesses the motion detection analysis module 1002 to customize the region that the camera(s) are fixed on. The system user then accesses the surveillance module 1004 to generate additional camera control signals CCS1 to point the camera(s) to the next fixed location to be customized and repeats these steps until the entire surveillance area has been initialized. At step 1106, system initialization is completed and the motion detection analysis module 1002 receives a "Begin Scan" signal. At step 1108, the motion detection analysis module 1002 reacts to the Begin Scan signal and the VCODS system 1000 enters automatic control. During automatic control, the camera(s) of the camera/PTZ modules 102 pan and scan the surveillance area based upon camera control signals CCS2 from the motion detection analysis module 1002. Accordingly, the camera/PTZ modules 102 pass video and ESD signals to the motion detection analysis module 1002. The video signals are subsequently analyzed by the Detection/PTZ Control module 108.

When image processing results in a moving object being detected at step 1110, manual control of the VCODS system 1000 occurs. More specifically, upon object detection, an alarm is activated (i.e., sounded or displayed) and an output video signal Vo representing the panned and scanned surveillance area containing the detected object is passed to the surveillance module 1004 and displayed on display device 1008. Depending upon image analysis, additional event data is passed to display device 1008 such as time of detection, specific coordinates of object on the zone map and most probable identification of object (i.e., car, person or the like). During manual control, a system user interfaces with the surveillance module 1004. With this degree of control, the user can study the detected object image and event data and generate camera control signals CCS1 to manually move the camera(s) to obtain more detailed images of the detected object, confirm the object's current location, verify its classification or other such steps necessary to ascertain possible threat and required response.

After the alarm condition has passed, the alarm is reset at step 1112 and the VCODS system 1000 reverts back to automatic control. For example, a system user has identified the detected object and notified the appropriate authorities or otherwise ascertained that the object is not a threat. Subsequently, the user sends a "Begin Scan" signal to the motion detection analysis module 1002. If no specific action is taken by a system user upon passing of a predetermined amount of time after the alarm has been triggered or if the system is otherwise idle, the surveillance module 1004 sends a "Begin Scan Mode" signal to the motion detection analysis module 1002. In either scenario, the method returns to step 1108 to enter automatic control again. The method ends at step 1114 when, for example, the motion detection analysis module 1002 is taken off line or otherwise interrupted.

In an alternative embodiment, the method 1100 may switch from automatic control of the cameras to manual mode. In one embodiment, the use of a camera control joystick by a user is automatically detected and the method stops automatic control of the cameras to allow the user to control the cameras. When the user stops using the joystick, the method may switch back into automatic camera control mode. Monitoring the joystick usage is only one possible method of detecting when a user desires to manually position the cameras.

While foregoing is directed to the preferred embodiment of the present invention, other and further embodiments of the invention may be devised without departing from the basic scope thereof, and the scope thereof is determined by the claims that follow.

The invention claimed is:

1. A method for performing surveillance comprising:
monitoring an indicia of manual imaging sensor control;
switching to automatic imaging sensor control when said indicia indicates that manual imaging sensor control is not being used and switching to manual imaging sensor control when said indicia indicates that manual imaging sensor control is being used;
determining imaging sensor coordinates for at least one imaging sensor;
mapping the imaging sensor coordinates to image pixel coordinates; and
processing the image pixel coordinates to determine information regarding an actual detection of at least one object in motion within a scene that is captured by the at least one imaging sensor; wherein said processing comprising generating parameters indicative of a first motion detection threshold, generating parameters indicative of a first consistent motion of the object over a predetermined number of captured images; generating parameters indicative of isolation of the pixel coordinates in a particular image and generating parameters indicative of a secondary consistent motion of the object over the predetermined number of captured images.

2. The method of claim 1 wherein the manual imaging sensor control comprises manipulating a joystick to control an orientation of an imaging sensor and said indicia comprises movement of the joystick.

3. The method of claim 1 wherein the orientation of the imaging sensor comprises pan, tilt, and zoom.

4. The method of claim 1 further comprises detecting object motion within the scene.

5. The method of claim 4 wherein, upon detecting object motion during automatic imaging sensor control, switching to manual imaging sensor control.

6. A method of performing surveillance comprising:
pointing an imaging sensor at a location in a scene;
detecting at least one moving object within the scene;
determining imaging sensor coordinates for at least one imaging sensor;
mapping the imaging sensor coordinates to image pixel coordinates;
processing the image pixel coordinates to determine information regarding an actual detection of the moving object within a scene that is captured by the at least one imaging sensor; wherein said processing comprising generating parameters indicative of a first motion detection threshold, generating parameters indicative of consistent motion of the object over a predetermined number of captured images; generating parameters indicative of isolation of the pixel coordinates in a particular image and generating parameters indicative of a secondary consistent motion of the object over the predetermined number of captured images; and
controlling pan, tilt and zoom functions of the imaging sensor to automatically track the moving object.

7. The method of claim 6 wherein the pointing step further comprises: manually directing the imaging sensor to image the location.

8. The method of claim 6 wherein the pointing step further comprises automatically scanning the imaging sensor across the scene to image the location; and continue scanning the scene until the moving object is detected.

9. The method of claim 6 further comprising deriving a latitude, longitude and altitude of the moving object based upon the pan, tilt and zoom parameters of the imaging sensor.

10. The method of claim 6 further comprising: predicting a sight line between the imaging sensor and the moving object; and using the sight line to optimally image the moving object.

11. The method of claim 10 further comprising a plurality of imaging sensors and using the sight line to select an imaging sensor from the plurality of imaging sensors that provides an optimal view of the moving abject.

12. The method of claim 6 wherein the location is a region of the scene that is imaged by the imaging sensor, and further comprising establishing a sensitivity level for processing information within the region.

13. The method of claim 12 wherein the sensitivity level establishes a motion detection sensitivity level.

14. The method of claim 6 wherein the information produced by the imaging sensor is displayed in combination with a zone map that depicts the scene.

15. The method of claim 14 wherein coordinates of locations in the zone map are mapped to pan/tilt/zoom parameters using a look-up table.

16. The method of claim 14 further comprising combining information from a plurality of imaging sensors with the zone map.

17. The method of claim 9 wherein a plurality of imaging sensors image the scene and the latitude, longitude and altitude of the moving object are used to handoff imaging of one imaging sensor to another imaging sensor.

18. A surveillance system comprising:
an imaging sensor control module for pointing an imaging sensor at a location in a scene;
an image processor for detecting a moving object within the scene, determining imaging sensor coordinates for the imaging sensor and mapping the imaging sensor coordinates to image pixel coordinates.
said image processor comprise a plurality of object detection filters to determine an actual detection of the moving object, wherein a first filter of the plurality of filters generates parameters indicative of a first motion detection threshold, a second filter of the plurality of filters generates parameters indicative of consistent motion of the object over a predetermined number of captured images, a third filter of the plurality of filters generate parameters indicative of the isolation of the pixel coordinates in a particular image, and a fourth filter of the plurality filters generates parameters indicative of a secondary consistent motion of the object over a predetermined number of captured images; and
a controller for controlling pan, tilt and zoom functions of the imaging sensor to automatically track the moving object.

19. The surveillance system of claim 18 wherein the image processor derives a latitude, longitude and altitude of the moving object based upon pan, tilt and zoom parameters of the imaging sensor.

20. The surveillance system of claim 18 wherein the image processor predicts a sight line between the imaging sensor and the moving object and uses the sight line to enable the imaging sensor control module to point the imagines sensor to optimally image the moving object.

21. The surveillance system of claim 20 further comprising a plurality of imaging sensors and using the sight line to select an imaging sensor from the plurality of imaging sensors that provides an optimal view of the moving object.

22. The surveillance system of claim 18 wherein the location is a region of the scene that is imaged by the imaging sensor, and the image processor establishes a sensitivity level for processing information within the region.

23. The surveillance system of claim 22 wherein the sensitivity level establishes a motion detection sensitivity level.

24. The surveillance system of claim 18 wherein the information produced by the imaging sensor is displayed in combination with a zone map that depicts the scene.

25. The surveillance system of claim 24 wherein coordinates of locations in the zone map are mapped to pan/tilt/zoom parameters using a look-up table.

26. The surveillance system of claim 24 further comprising combining information from a plurality of imaging sensors with the zone map.

27. The surveillance system of claim 18 wherein a plurality of imaging sensors image the scene and the latitude, longitude and altitude of the moving object are used to handoff imaging of one imaging sensor to another imaging sensor.

* * * * *